(12) United States Patent
Stewart et al.

(10) Patent No.: US 6,513,449 B1
(45) Date of Patent: Feb. 4, 2003

(54) MARINE DOCKING DEVICE

(75) Inventors: Robert E. Stewart, Union, MI (US); Keith Schrader, Sturgis, MI (US); Michael J. Willis, Plainwell, MI (US)

(73) Assignee: Buoyant Solutions, Inc., Sturgis, MI (US)

( * ) Notice: Subject to any disclaimer, the term of this patent is extended or adjusted under 35 U.S.C. 154(b) by 0 days.

(21) Appl. No.: 10/028,206

(22) Filed: Dec. 21, 2001

(51) Int. Cl.[7] .............................................. B63B 59/02
(52) U.S. Cl. ...................... 114/219; 405/212; 405/214
(58) Field of Search ................................ 114/219, 220, 114/343, 364, 230.1, 230.15, 230.19; 405/212, 213, 214, 215; D12/167, 168; 267/139, 140.13, 140.4; 293/1, 24–26, 132, 135, 136

(56) References Cited

U.S. PATENT DOCUMENTS

| | | | | |
|---|---|---|---|---|
| 747,660 A | * | 12/1903 | Swearingen ................... | 14/76 |
| 2,420,677 A | * | 5/1947 | Peterson ...................... | 405/212 |
| 3,254,491 A | * | 6/1966 | Levinton ..................... | 405/213 |
| 3,564,858 A | * | 2/1971 | Pogonowski ................ | 405/212 |
| 4,109,474 A | * | 8/1978 | Files et al. .................. | 405/213 |
| 4,293,241 A | * | 10/1981 | Helveston et al. ........... | 405/213 |
| 4,337,009 A | * | 6/1982 | Jackson ....................... | 405/212 |
| 4,398,848 A | * | 8/1983 | Guilbeau .................... | 405/212 |
| 4,607,586 A | * | 8/1986 | Taquino ....................... | 114/219 |
| 5,716,166 A | * | 2/1998 | Phillips et al. .............. | 405/211 |
| 6,112,690 A | * | 9/2000 | Anderson .................... | 114/220 |

\* cited by examiner

*Primary Examiner*—S. Joseph Morano
*Assistant Examiner*—Ajay Vasudeva
(74) *Attorney, Agent, or Firm*—Flynn, Thiel, Boutell & Tanis, P.C.

(57) ABSTRACT

A marine docking device according to the present invention includes a fender having a first end coupled to a first arm by a first attachment member and a second end coupled to a second arm by a second attachment member. The first attachment member and the second attachment member are configured to prevent the fender from rotating about a longitudinal axis that passes through the first end and the second end. The first arm includes a compression assembly that facilitates movement of the first end between a first position and a second position. The compression assembly includes a tubular member that is slidable within a sleeve. A spring is compressed between a first spring abutment provided on the sleeve and a second spring abutment provided on the tubular member. The first spring abutment is continuously urged toward an advanced position by the spring.

13 Claims, 7 Drawing Sheets

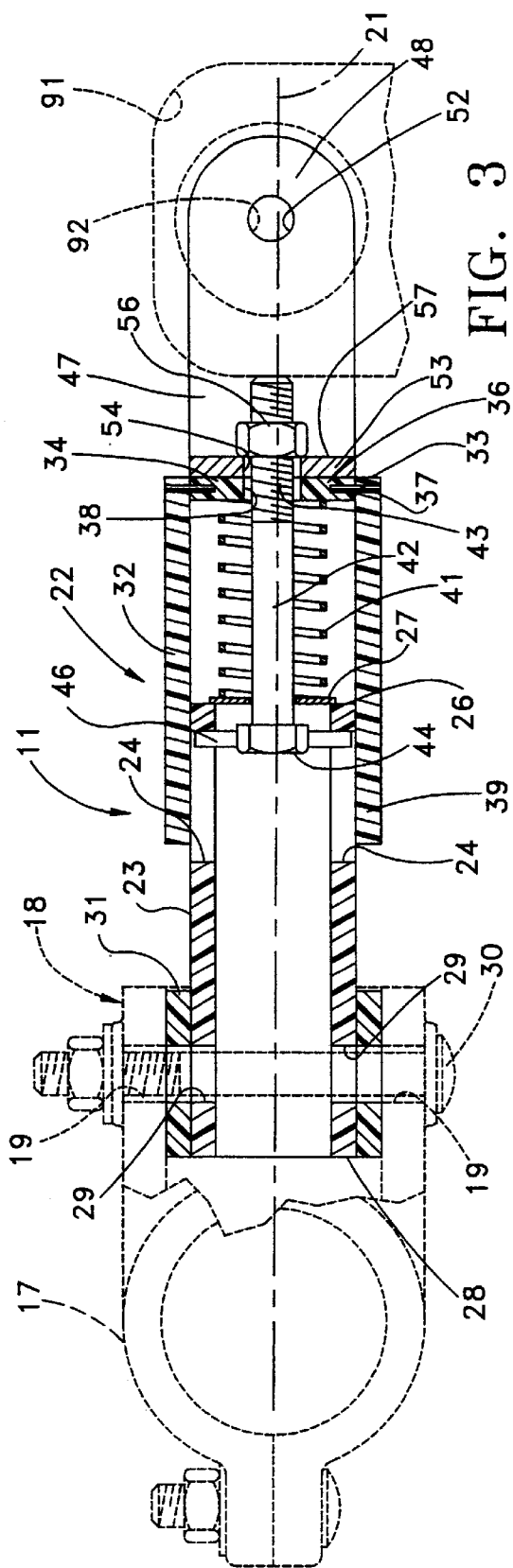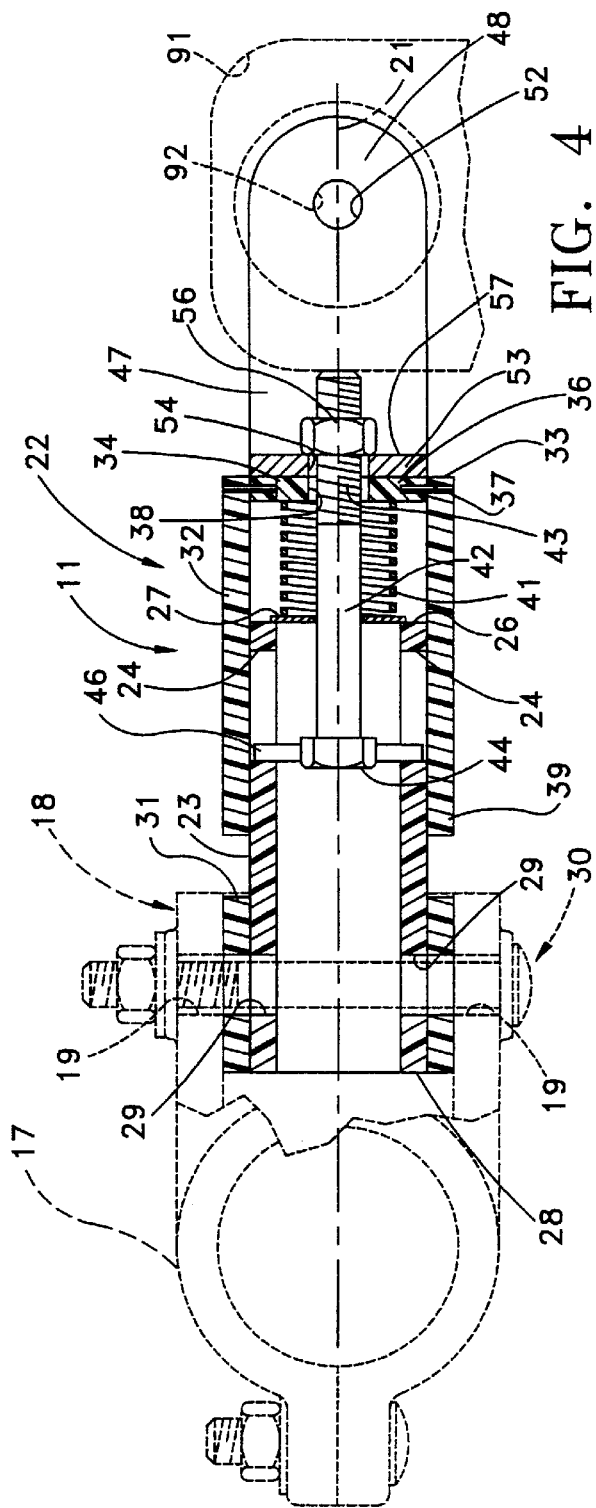

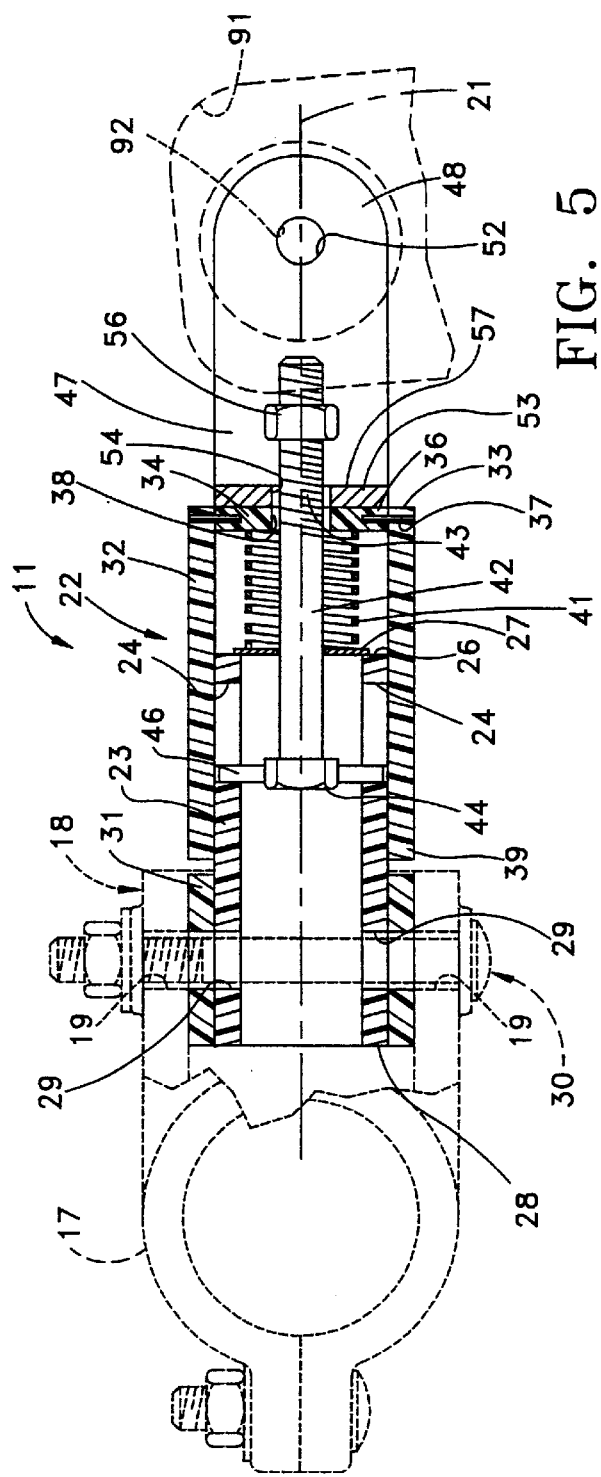
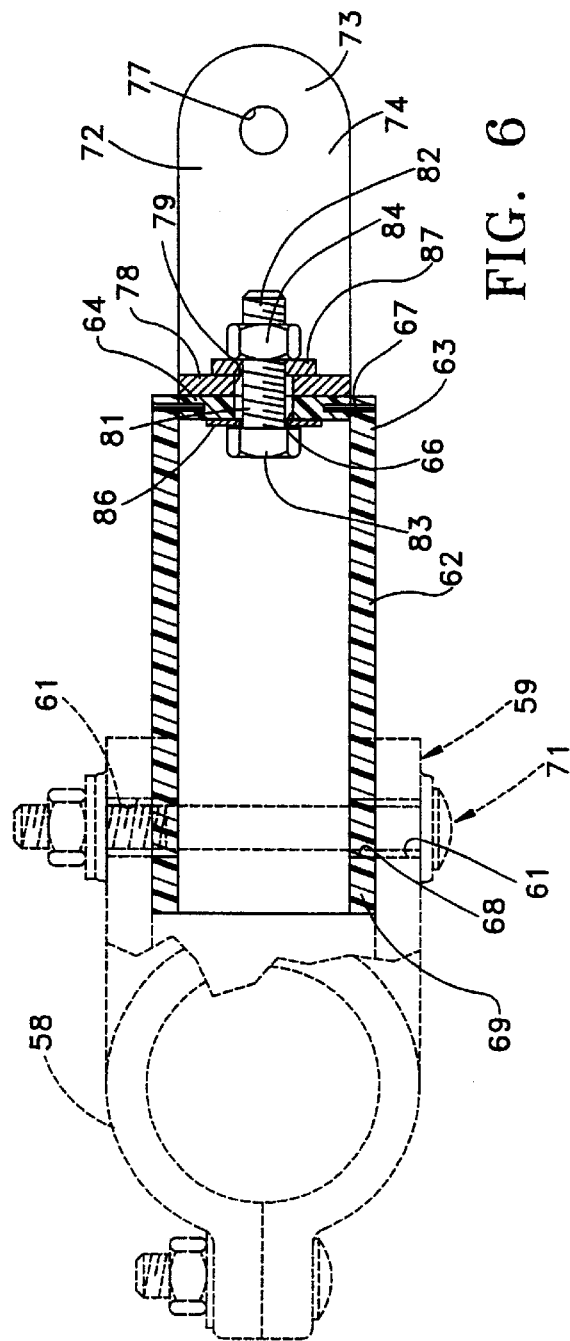

MARINE DOCKING DEVICE

FIELD OF THE INVENTION

This invention relates generally to a marine docking device and, more particularly, to a marine docking device including a fender that is non-rotational.

BACKGROUND OF THE INVENTION

A variety of solutions have been proposed to prevent damage to boats that are landing or secured to a dock. These solutions include devices that are either suspended from a boat or attached to the dock itself. Regarding those devices that are attached to the dock structure itself, the solutions range from tires suspended from the dock to frames that are attached to the dock and include a number of fenders. While devices such as these can protect a boat that is secured to a dock, deficiencies exist with these devices.

For instance, while tires can protect a boat from being scratched by the dock, they are also prone to leaving marks on the hull of the boat that are difficult to remove. Further, the attachment of tires to a dock is not an aesthetically pleasing solution. Regarding the frame disclosed above, this solution can be both costly and complex. Additionally, if one or more of the fenders is damaged or lost, the boat is unprotected from the frame, which can cause at least as much damage as contact with the dock. Thus, there exists room for improving upon these docking devices.

SUMMARY OF THE INVENTION

The objects and purposes of the invention are met by providing a marine docking device having a fender that has a first end coupled to a first arm by a first attachment member and a second end coupled to a second arm by a second attachment member. The first and second attachment members are configured to prevent the fender from rotating about a longitudinal axis that passes through the first and second ends of the fender. The first arm includes a compression assembly that is coupled to the first attachment member to facilitate movement of the first end of the fender between a first position and a second position. The compression assembly includes a spring and a tubular member that is slidable within a sleeve. The spring is compressed between a first spring abutment provided on the sleeve and a second spring abutment provided on the tubular member. The first spring abutment is movable with respect to the tubular member from an advanced position to a retracted position against an urging of the spring. The spring continuously urges the first spring abutment toward the advanced position.

BRIEF DESCRIPTION OF THE DRAWINGS

The above and further features and benefits of this invention will be understood by reference to the following detailed description, as well as by reference to the following drawings in which:

FIG. 3 is a cross sectional view of the first, upper arm of the marine docking device of FIG. 2 in an uncompressed position;

FIG. 4 is a cross sectional view of the first, upper arm of FIG. 3 in a partially compressed position;

FIG. 5 is a cross sectional view of the first, upper arm of FIG. 3 in a fully compressed position;

FIG. 6 is a cross sectional view of the second, lower arm of one marine docking device of FIG. 1;

DETAILED DESCRIPTION

Figure 1:
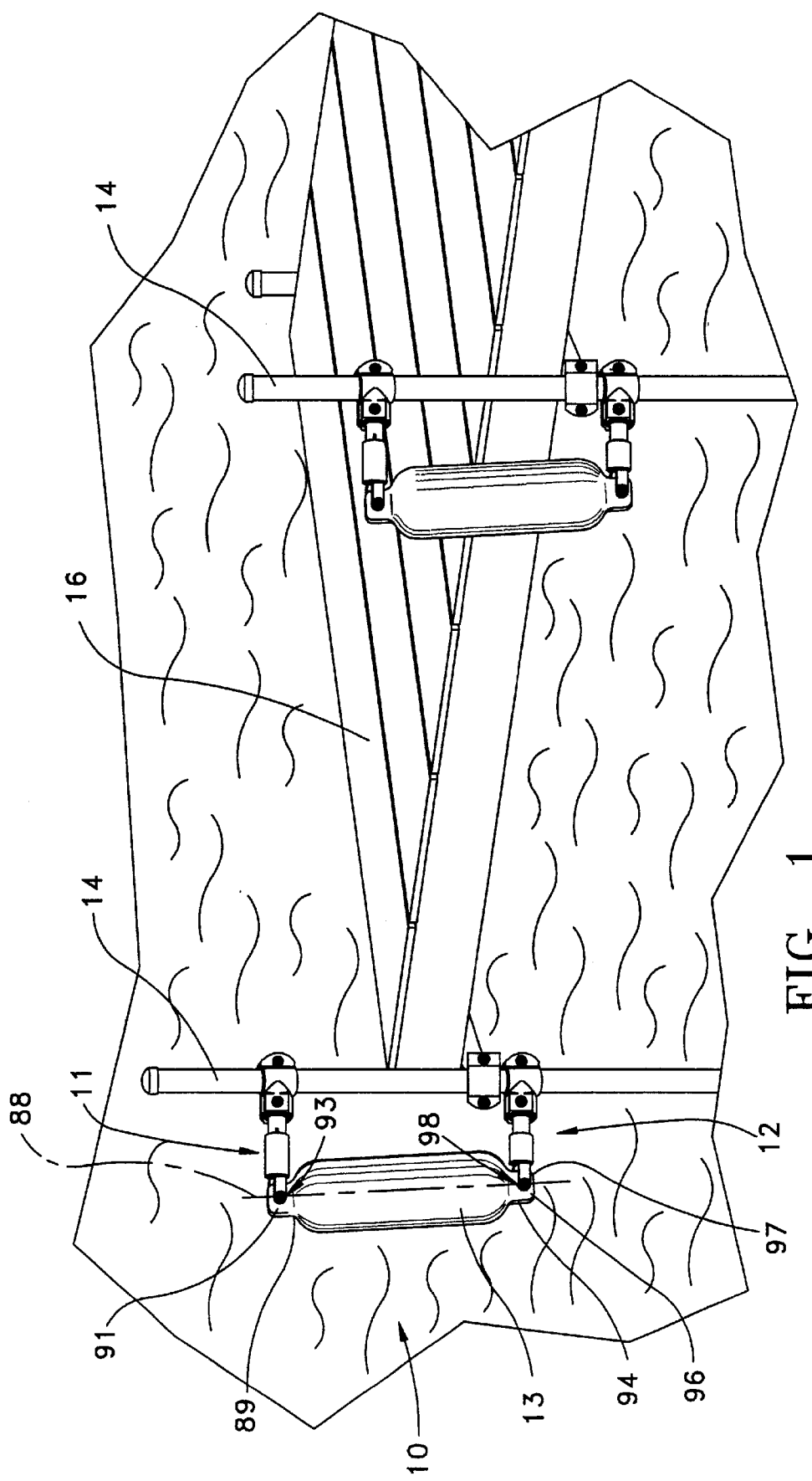
FIG. 1 is a isometric view of a dock including two marine docking devices according to the present invention.
Figure 2:
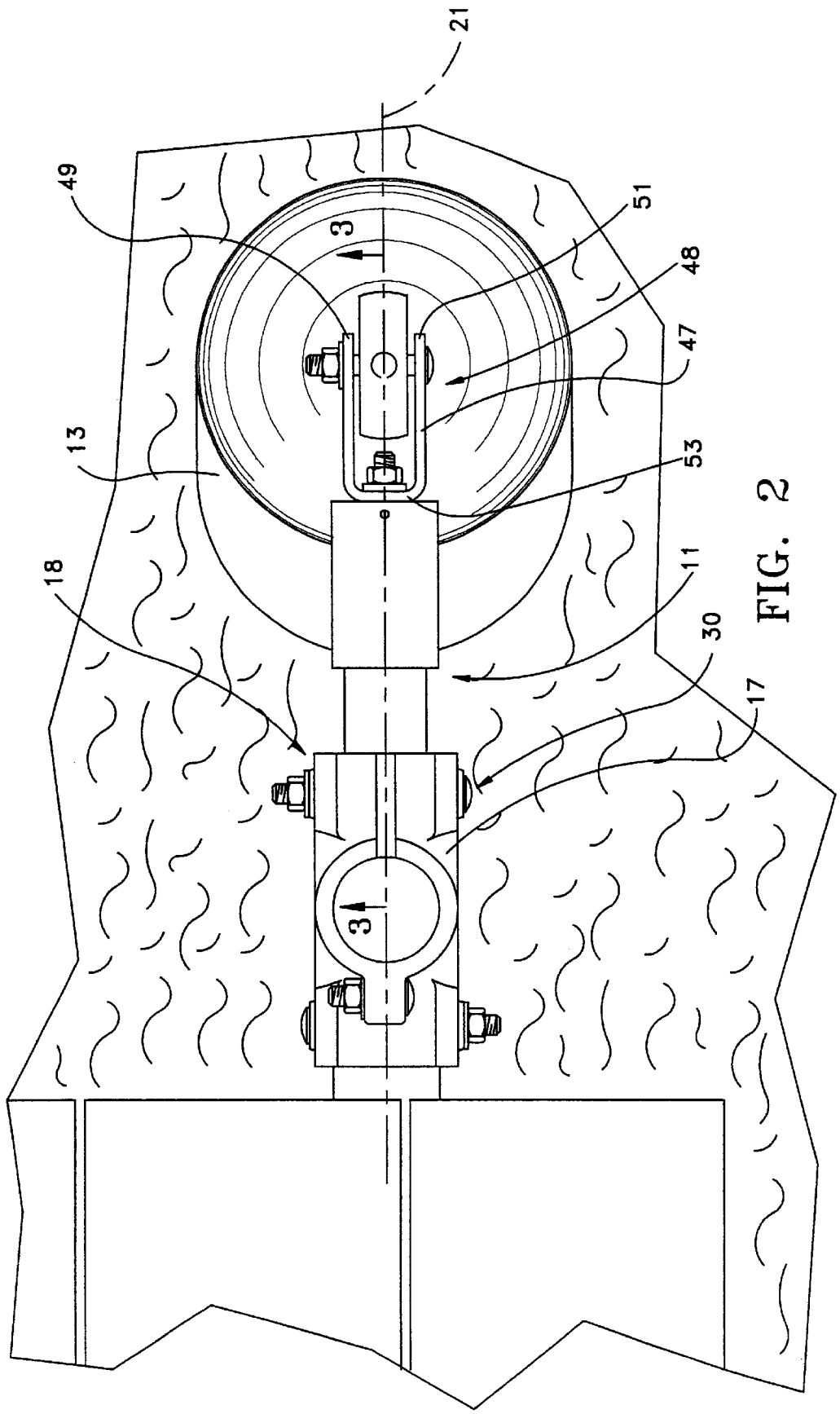
FIG. 2 is a top view of one marine docking device of FIG. 1.

Referring to FIGS. 1–3, there is illustrated a marine docking device 10 according to the present invention. The marine docking device 10 includes a first arm 11 and a second arm 12 which are connected at their respective distal ends to a fender 13. The first arm 11 and the second arm 12 are connected at their respective opposite ends to a support post 14 of a dock 16. The first arm 11 includes a conventional first mounting bracket 17 that is secured to the dock support post 14. The first mounting bracket 17 includes a receiving portion 18 oriented on a horizontal axis 21 and additionally has thereon a pair of axially aligned bores 19 extending on an axis perpendicular to the horizontal axis 21.

The first arm 11, also oriented co-extensively with the horizontal axis 21, has a compression assembly 22 thereon that facilitates a controlled change in the length of the first arm 11. The compression assembly 22 includes a hollow tubular member 23 that has a first end 26 that has a pair of elongated and coaxially related slots 24 in the wall thereof. A washer 27 is positioned against the first end 26. Adjacent a second end 28 of the tubular member 23 there is provided a pair of axially aligned bores 29. The tubular member 23 has an outer diameter that is less than an inner diameter of the receiving portion 18 of the first mounting bracket 17 such that the tubular member 23 can be received therein. The axially aligned bores 29 of the tubular member 23 are aligned with the bores 19 defined by the receiving portion 18 such that a nut and bolt assembly 30 or other fastener can be inserted therethrough to connect these components together. If the outer diameter of the tubular member 23 is significantly smaller than the inner diameter of the receiving portion 18 of the first mounting bracket 17, a spacer 31 can be inserted between the components.

The compression assembly 22 also includes a sleeve 32. The sleeve 32 is a hollow tubular component having a first end 33 whereat there is provided an end wall 34. The end wall 34 is attached to the sleeve 32 by a plurality of radially oriented pins 37. The end wall 34 could also be attached to the sleeve 32 by an adhesive or another suitable fastener mechanism. The end wall 34 has an outer axially facing surface 36 as well as a through bore 38 aligned with the axis 21. The sleeve 32 has a second, open end 39 that is opposite the first end 33. The inner diameter of the sleeve 32 is greater by a nominal clearance amount than the outer diameter of the tubular member 23.

The second end 39 of the sleeve 32 is telescopically positioned over the first end 26 of the tubular member 23 such that the sleeve 32 can slide along the tubular member 23 relative to and along the horizontal axis 21. Thus, the end wall 34 can move along the horizontal axis 21 relative to the first end 26 of the tubular member 23 and the washer located thereat. A spring 41 is compressed between the end wall 34 and the washer 27. The spring 41 constantly urges the end wall 34 away from the washer 27. When the spring 41 is in its initial compression state, the end wall 34 is at a first, advanced position with respect to the washer 27 and the tubular member 23. When the spring 41 is compressed, the end wall 34 is moved toward the washer 27.

The compression assembly 22 also includes an elongate bolt 42 having an axis congruent with the axis 21 and having a thread at one end 43 and a head 44 at the opposite end. The head 44 includes a transversely extending pin 46 that has a length that is greater than the inner diameter of the tubular member 23, but less than the outer diameter of the tubular member 23. The threaded end 43 has a diameter that is smaller than the diameter of the bore 38 and extends through the bore 38.

When the compression assembly 22 is assembled as illustrated, the opposite ends of the pin 46 are slidably received in the aligned slots 24 in the tubular member 23. The pin 46 is slidable within slots 24 between an advanced position, shown in FIG. 3, and a retracted position, shown in FIG. 4. Since the pin 46 has a length greater than the inner diameter of the tubular member 23, the pin 46 will not disengage from the slots 24 as it slides. Additionally, since the pin 46 is shorter than the outer diameter of the tubular member 23, the pin 46 will not contact the sleeve 32 as the sleeve advances and retracts along the tubular member 23. Since the threaded end 43 has a diameter that is less than the diameter of the bore 38, the end wall 34 can slide freely along the length of the bolt 42.

The first arm additionally includes a U-shaped clevis 47 that has a receiving end 48 defined by a pair of spaced arms 49 and 51, each having a bore 52 therethrough axially aligned with the other. The clevis 47 includes a contact or bight portion 53 connecting the arms 49 and 51 together. A bore 54 extends through the contact portion 53 and is aligned with the axis 21. The contact portion 53 has an outer surface 57 that is in contact with the outer surface 36 of the end wall 34. The contact portion 53 is positioned adjacent the end wall 34 such that the bore 54 is axially aligned with the bore 38. The clevis 47 is secured in this position by a nut 56 that is tightened around the threaded end 43 of the bolt 42 and against the distally facing surface of the contact portion 53.

Returning to the marine docking device 10, the second arm 12 includes a conventional second mounting bracket 58 that is secured to dock support post 14 at a position below the first mounting bracket 17. Referring to FIG. 6, the second mounting bracket 58 includes a receiving portion 59 that has thereon a pair of transversely spaced and axially aligned bores 61. While the first arm 11 is compressible, the second arm 12 is preferably incompressible.

The second arm 12 includes a hollow tubular member 62 having a first end 63 that includes an end wall 64. The end wall 64 is attached to the tubular member 62 by a plurality of radially oriented pins 67, or by another suitable attachment means. A through bore 66 is provided on the end wall 64. At a second end 69 of the tubular member 62 there is provided a pair of transversely aligned bores 68. The tubular member 62 has an outer diameter that is less than the inner diameter of the receiving portion 59 of the second mounting bracket 58 such that the tubular member 62 can be received therein. The bores 68 are to be aligned with the bores 61 on the receiving portion 59 so that a nut and bolt assembly 71 or other fastener can be inserted therethrough. As with the first arm 11, if the outer diameter of the tubular member 62 is significantly smaller than the inner diameter of the second mounting bracket 58, a spacer can be inserted between the components.

A second U-shaped clevis 72 is provided that has a receiving end 73 defined by a pair of spaced arms 74 and 76, each of which has a bore 77 therethrough aligned with the other bore. The second clevis 72 includes a bight or contact portion 78 connecting the arms 74 and 76 together. A bore 79 extends through the contact portion 78. The contact portion 78 is positioned adjacent the end wall 64. An elongate bolt 81 is provided that includes a threaded end 82 and a head 83 at the other end. The bolt 81 is positioned to extend through the bores 66 and 79. A nut 84 is tightened around the threaded end 82 of the bolt 81 to urge the contact portion 78 against the end wall 64 of the tubular member 62. If desired, a first washer 86 can be positioned between the head 83 of the bolt 81 and the end wall 64 and a second washer 87 can be positioned between the nut 84 and the clevis contact portion 78.

Referring again to FIG. 1, the marine docking device 10 supports the fender 13, which is composed of an elastically yieldable material. The fender 13 can be any fender known in the art that is suitable for use in marine applications. The fender 13 has a longitudinal axis 88 that passes through a first fender end 89 and a second fender end 94. The first fender end 89 includes a flat-like flange 91 having a bore 92 therethrough. The flange 91 has a thickness that is slightly smaller than an inner clearance between the arms 49 and 51 of the receiving end 48 of the first clevis 47. The flange 91 of the first fender end 89 is positioned within the inner clearance of the first clevis 47 such that the flange 91 of the first fender end 89 contacts the threaded end 43 of the bolt 42. The bore 92 at the first fender end 89 is axially aligned with the bores 52 on the first clevis 47 so that a nut and bolt assembly 93 or other suitable attachment means can be inserted therethrough.

The second fender end 94 also includes a flat-like flange 96 with a bore 97 therethrough. As with the first fender end 89, the flange 96 of the second fender end 94 has a thickness that is slightly smaller than an inner clearance between the arms 74 and 76 of the receiving end 73 of the second clevis 72. The flange 96 of the second fender end 94 is positioned within the inner clearance of the receiving end 73 of the second clevis 72. The bore 97 in the second fender end 94 is axially aligned with the bores 77 on the second clevis 72 such that a nut and bolt assembly 98 or other suitable attachment means can be inserted therethrough. The first clevis 47 and the second clevis 72 are configured to prevent the fender 13 from rotating about the longitudinal axis 88.

When a boat is landing at the dock 16, a force will be exerted on the fender 13 along the horizontal axis 21. If the force is greater than the opposing force of the spring 41, a controlled change in the length of the first arm 11 will be facilitated by the compression assembly 22 and the first arm 11 will be compressed. When the first arm 11 is compressed, the first fender end 89 pushes the bolt 42 from its extended position shown in FIG. 3 toward its retracted position along the horizontal axis 21 shown in FIG. 4. In addition, since the first fender end 89 is secured to the arms 49 and 51 of the receiving end 48 of the first clevis 47, the clevis 47 is pushed toward a retracted position as well. As a result of the retracting movement of the bolt 42 and the first clevis 47, the end wall 34 of the sleeve 32 is moved toward the washer 27.

As the bolt 42 retracts, the pin 46 is moved to its retracted position within the slots 24 (FIG. 4). Once the pin 46 is seated in its retracted position, the bolt 42 can no longer retract along the horizontal axis 21. However, since the end wall 34 can slide freely along the length of the bolt 42, the sleeve 32 can continue to retract along the axis 21. Thus, if the first arm 11 is subjected to a sufficiently high compression force, the first clevis 47 will continue to move the sleeve 32 toward its retracted position along the bolt 42 against the urging of the spring 41. As the clevis 47 and the sleeve 32 retract, the distally facing surface of the contact portion 53 will no longer be in contact with the nut 56, which is tightened about the threaded portion of the bolt 42. As the sleeve 32 continues to retract, the first arm 11 will be moved toward a fully compressed position (FIG. 5). The sleeve 32 will continue to retract in this manner until the second end 39 contacts the mounting bracket 17, the spring 41 reaches its maximum compressibility or until the force exerted along the horizontal axis 21 is no longer sufficient to overcome the opposing force of the spring 41.

When the external force exerted on the compression assembly 22 is reduced to less than the opposing force of the spring 41, the sleeve 32 will be returned toward its advanced position along the bolt 42 by the spring 41. The clevis 47 will advance in a corresponding manner. If the external force has dropped sufficiently, the clevis 47 will advance until the distally facing surface of the contact portion 53 is once again in contact with the nut 56. Once the first clevis 47 engages the nut 56, the urging force of the spring 41 can act on the bolt 42. The bolt 42 can now advance under the force of the spring 41. In response to the return force of the spring 41, the bolt 42 will begin to return toward its advanced position. If the external force exerted on the compression assembly 22 is reduced to zero, the bolt 42 will be returned to its advanced position under the influence of the spring 41. The sleeve 32 and the pin 46 will therefore be returned to their advanced positions in a corresponding manner.

Figure 7:
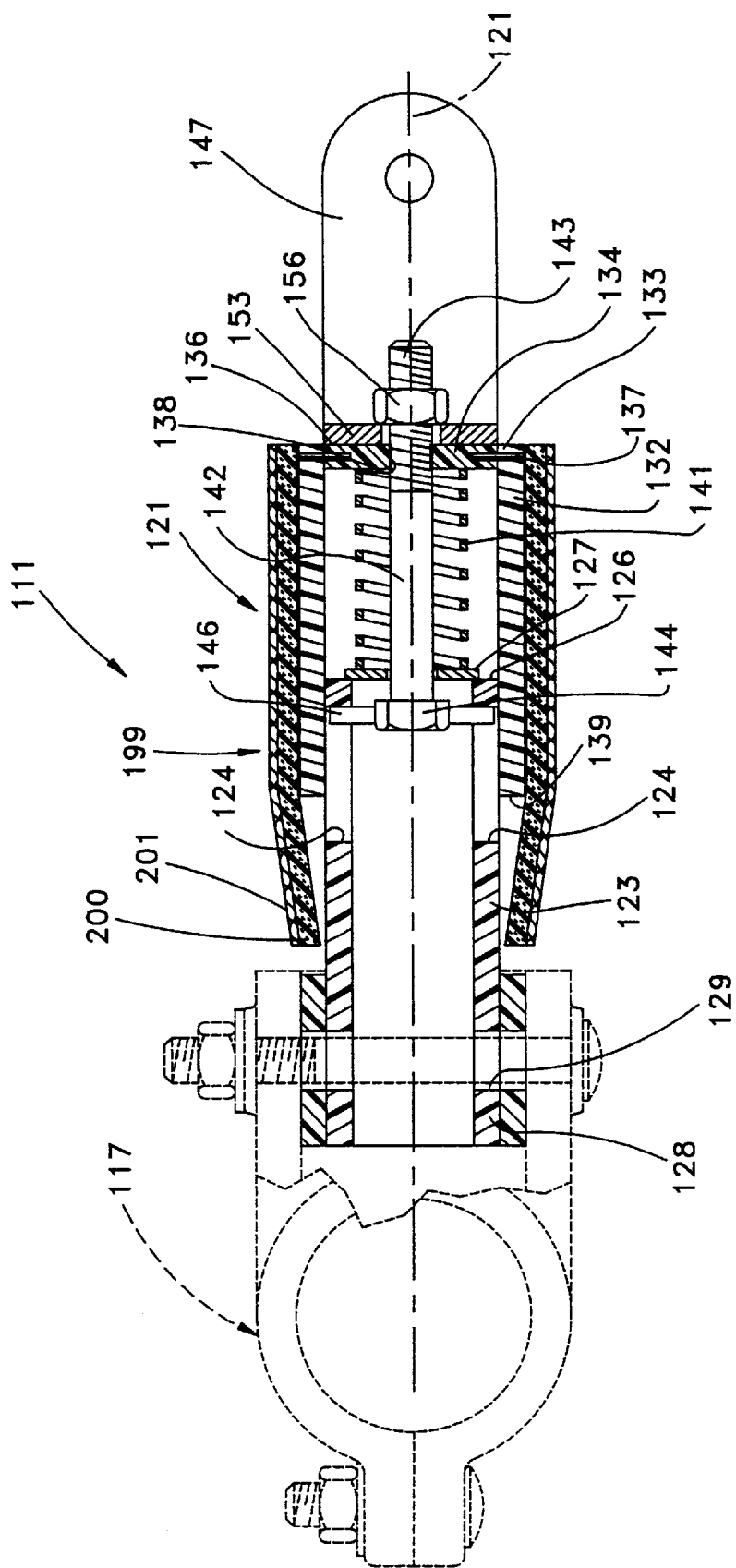
FIG. 7 is a cross sectional view of the first, upper arm of the marine docking device of FIG. 2 according to an alternate embodiment of the present invention.

Referring now to FIG. 7, an alternative embodiment 111 of the first arm 11 is illustrated. The first arm 111 includes a number of components that are identical to components described for the previous embodiment of the present invention. For instance, the first arm 111 includes a first mounting bracket 117 and a first clevis 147 that are identical to the first mounting bracket 17 and the first clevis 47, respectively. Therefore, a detailed description of these components will not be repeated. For continuity, those components that are similar, or identical, to features described previously have been labeled with feature numbers in the 100 series corresponding to the feature numbers for the previous embodiment, which were between 10 and 57.

The first arm 111, which is oriented co-extensively with a horizontal axis 121, includes a compression assembly 122 that facilitates a controlled change in the length of the first arm 111. The compression assembly 122 includes a tubular member 123 that is similar to the tubular member 23 of the previous embodiment. The tubular member 123 includes a first end 126 and a pair of elongated slots 124 in the wall thereof. Positioned against the first end 126 is a washer 127. The tubular member 123 has a second end 128 opposite to the first end 126 adjacent which there is provided a pair of transversely aligned bores 129. The tubular member 123 has an outer diameter that is less than the inner diameter of a receiving portion 118 of the first mounting bracket 117 so the tubular member 123 can be received by the bracket in the manner previously described. The aligned bores 129 of the tubular member 123 can be aligned with the bores 119 on the receiving portion 118 of the first mounting bracket 117 such that a nut and bolt assembly 130 or other fastener can be inserted therethrough. If the outer diameter of the tubular member 123 is significantly smaller than the inner diameter of the receiving portion 118, a spacer 131 can be inserted between the components.

The compression assembly 122 also includes a sleeve 132. The sleeve 132 is a hollow tubular inner member that has at a first end 133 whereat there is provided an end wall 134. The end wall 134 is attached to the sleeve 132 by a plurality of radially oriented pins 137. The end wall 134 could also be attached to the sleeve 132 by an adhesive or by any other suitable fastening mechanism. The end wall 134 has an outer axially facing surface 136 and a central bore 138 extending therethrough and aligned with the horizontal axis 121. The sleeve 132 has a second, open end 139 that is opposite the first end 133. The inner diameter of the sleeve 132 is greater by a nominal clearance than the outer diameter of the tubular member 123.

The second end 139 of the sleeve 132 is telescopically positioned over the first end 126 of the tubular member 123 such that sleeve 132 can slide along the tubular member 123 relative to and along the horizontal axis 121. Thus, the end wall 134 can move along the horizontal axis 121 relative to the first end 126 of the tubular member 123 and the washer 127 located thereat. A spring 141 is compressed between end wall 134 and washer 127. The spring 141 constantly urges the end wall 134 away from the washer 127. When the spring 141 is in its initial compression state, the end wall 134 is at a first, advanced position with respect to the washer 127 and the tubular member 123, as shown in FIG. 7. When the spring 141 is compressed, the end wall 134 is moved toward the washer 127.

The compression assembly 122 also includes an elongate bolt 142 having an axis congruent with the axis 121. The bolt 142 has a thread at one end 143 and a head 144 at the opposite end. The head 144 includes a transversely extending pin 146 that has a length that is greater than the inner diameter of the tubular member 123, but less than the outer diameter of the tubular member 123. The threaded end 143 has a diameter that is about equal to the diameter of the bore 138 and extends through the bore 138.

When the compression assembly 122 is assembled as illustrated, the opposite ends of the pin 146 are slidably received in the aligned slots 124. The pin 146 can slide within the slots 124 between an advanced position, shown in FIG. 7, and a retracted position. Since the pin 146 has a length that is greater than the inner diameter of the tubular member 123, the pin 146 will not disengage from the slots 124 as the pin 146 slides. Additionally, since the pin 146 has a length that is less than the outer diameter of the tubular member 123, the pin 146 will not contact the sleeve 132 as the sleeve advances and retracts. Unlike the previous embodiment, the bolt 142, which has a diameter about equal to that of the bore 138, is threaded to the end wall 134 in the bore 138. Therefore, the sleeve 132 will not be able to retract along the horizontal axis 121 with respect to the bolt 142.

As indicated previously, the first arm 111 additionally includes a clevis 147. Clevis 147 is identical to the clevis 47 described for the previous embodiment. Therefore, a detailed description will not be provided. As described for the previous embodiment, a clevis contact portion 153 is positioned in contact with the outer axially facing surface 136 of the end wall 134. The clevis 147 is secured to the end wall 134 by a nut 156 that is tightened around the threaded end 143 of the bolt 142 and against the distally facing surface of the contact portion 153. While not illustrated, the flange 191 of a first end 189 of a fender 113 would be attached to the clevis 147.

If it is desired to alter the aesthetic properties of the first arm 111, a decorative covering 199 can be included, as illustrated in FIG. 7. The decorative covering 199 includes an inner padded portion 200 that can be placed around the first arm 111. An outer covering 201 could then be secured around the padded portion 200, such as by Velcro, snaps or another suitable fastener. Preferably, the components of the decorative covering 199 are removably attached to each other and to the first arm 111 to allow for easy removal for cleaning or replacement, or when it is desired to access the first arm 111.

When no force is exerted on the first arm 111, the compression assembly 122 is oriented as illustrated in FIG. 7. When the compression assembly 122 is in this position, the end wall 134 is urged toward its advanced position by the spring 141. In this position, the pin 146 is in its advanced position in the slots 124. When the first arm 111 is exposed to an external compression force along the horizontal axis 121 that is greater than the opposing force of the spring 141, the compression assembly 122 will facilitate a controlled compression of the first arm 111. The external force will cause the clevis 147 to move along the horizontal axis 21 toward a retracted position. The clevis 147 will act on the end wall 134 and cause the end wall 134 to move toward the washer 127. Since the bolt 142 is threaded to the bore 138 of the end wall 134, the bolt 142 will retract along the horizontal axis 121 with the end wall 134 and the sleeve 132. The pin 146 will be moved in a corresponding manner along the horizontal axis 21 toward its retracted position in the slots 124. The retracting movement of the sleeve 132 will cause the spring 141 to be compressed between the end wall 134 and the washer 127. However, unlike the previous embodiment, since the bolt 142 is threaded to the bore 138, no independent movement of the sleeve 132 along the horizontal axis 121 will occur once the pin 146 is seated in its retracted position. The sleeve 132 will continue to retract until the second end 139 contacts the first mounting bracket 117, the spring 141 reaches its maximum compressibility or until the external force exerted on the compression assembly 122 is no longer sufficient to overcome the opposing force of the spring 141.

Figure 8:
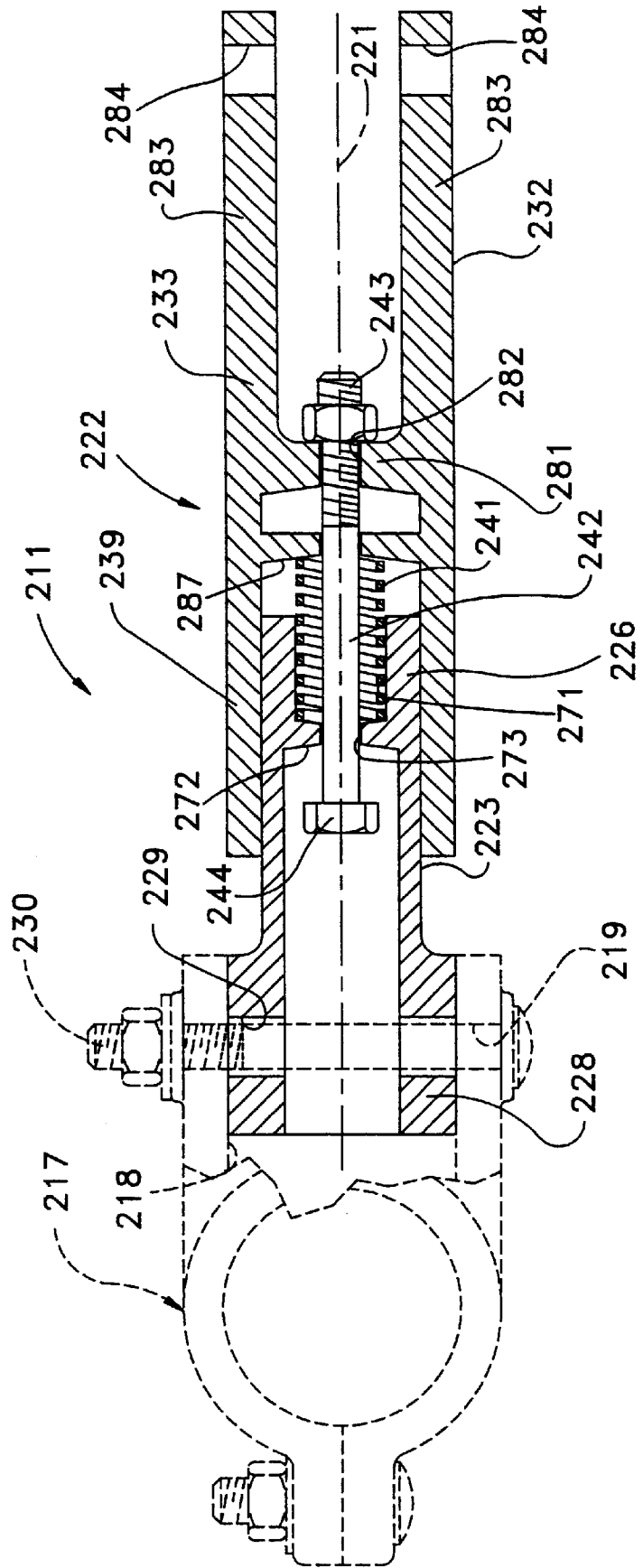
FIG. 8 is a cross sectional view of the first, upper arm of the marine docking device of FIG. 2 according to yet another embodiment of the present invention.

Referring now to FIG. 8, a further alternative embodiment 211 of the first arm 11 is illustrated. The first arm 211 includes a number of components that are identical to components described for the previous embodiments of this invention. For example, the arm 211 includes a first mounting bracket 217 that is identical to the mounting brackets 17 and 117. Thus, a detailed description of this, and other, identical components will not be repeated. For continuity, those components that are similar, or identical, to features described previously have been labeled with feature numbers in the 200 series corresponding to the feature numbers for the first and second embodiments, which were numbered from 10–57 and 110–199.

The first arm 211 is oriented along a horizontal axis 221. A compression assembly 222 is included in the first arm 211 to facilitate a controlled change in the length of the first arm 211. The compression assembly 222 includes a tubular member 223 that is composed of aluminum or another suitable material. The tubular member 223 has a first end 226 including a recess 271. Extending through a bottom surface 272 of the recess 271 is a bore 273 that is aligned with the axis 221.

The tubular member 223 has a second end 228 opposite the first end 226. A pair of transversely aligned bores 229 extend through the second end 228. The outer diameter of the second end 228 is greater than that of the first end 226, but less than the inner diameter of a receiving portion 218 of the first mounting bracket 217. The second end 228 can thus be received by the bracket 217. The aligned bores 229 of the tubular member 223 can be aligned with the bores 219 on the receiving portion 218 of the first mounting bracket 217 such that a nut and bolt assembly 230 or other fastener can be inserted therethrough. As with the previous embodiments, if the outer diameter of the tubular member 223 is significantly smaller than the inner diameter of the receiving portion 218, a spacer (not shown) can be inserted between the components.

The compression assembly 222 also includes a sleeve 232. The sleeve 232 is a hollow tubular member also composed of a suitable material, such as aluminum. Extending from a first end 233 of the sleeve 232 and integral therewith are two spaced apart arms 283. A pair of axially aligned bores 284 extend through the arms 283. This configuration of the sleeve 232 allows the second arm 211 to omit the separate clevis 17, 117 of the previous embodiments. The clearance between the arms 283 of the sleeve 232 is slightly larger than the thickness of the flange 91 (FIG. 2) of the first fender end 89. When the arm 211 is secured to the fender 13, the flange 91 is positioned between the arms 283 so the bore 92 (FIG. 3) at the first fender end 89 is axially aligned with the bores 284. A nut and bolt assembly 93 (FIG. 1) or other suitable attachment means can be inserted therethrough to attach the second arm 211 to the first fender end 89.

The sleeve 232 has a second end 239 opposite the first end 233 that includes a recess 280. A bore 282 extends through a bottom surface 281 of the recess 280 and is aligned with the axis 221. An annular step 287 is provided in the recess 280. The inner diameter of the second end 239 of the sleeve 232 is greater by a nominal clearance than the outer diameter of the tubular member 223.

The second end 239 of the sleeve 232 is telescopically positioned over the first end 226 of the tubular member 223. The sleeve 232 can therefore slide along the tubular member 223 relative to and along the horizontal axis 221. Thus, the annular step 287 can move along the horizontal axis 221 relative to the first end 226 of the tubular member 223. A spring 241 is compressed between annular step 287 and the bottom surface 272 of the recess 271 in the tubular member 223. The spring 241 constantly urges the annular step 287 away from the bottom surface 272. When the spring 241 is in its initial compression state, the annular step 287 is at a first, advanced position with respect to the bottom surface 272 and the first end 226 of the tubular member 223. When the spring 241 is compressed, the annular step 287 is moved toward the bottom surface 272, as shown in FIG. 8. It should be appreciated that the annular step 287 could be omitted from this embodiment so that the spring 241 is compressed between the surface 281 of the sleeve 232 and the bottom surface 272 of the tubular member 223.

Returning to FIG. 8, the compression assembly 222 also includes an elongate bolt 242 having an axis aligned with the axis 221. The bolt 242 has a threaded portion 243 and a head 244. The bolt 242 extends through the bores 273 and 282. The threaded portion 243 has a diameter that is about equal to the diameter of the bore 282, therefore, the bolt 243 will not move independent of the sleeve 232. However, the bore 282 could be sized to allow the bolt to move with respect to the sleeve 232, such as in the FIGS. 1–5 embodiment. When the compression assembly 222 is assembled, the bolt 242 extends through the center of the spring 241.

When no force is exerted on the first arm 211, the annular step 287 is urged toward its advanced position by the spring 241. When the first arm 211 is exposed to an external compression force along the horizontal axis 221 that is greater than the opposing force of the spring 241, the compression assembly 222 allows a controlled compression of the first arm 211, as illustrated in FIG. 8. The external force causes the sleeve 232, and thus the annular step 287, to move toward the tubular member 223, causing the bolt 242 to retract along the horizontal axis 221. The retracting movement of the sleeve 232 causes the spring 241 to be compressed between the annular step 287 and the bottom surface 272 of the tubular member 223. The sleeve 232 will continue to retract until the spring 241 reaches its maximum compressibility or until the external force exerted on the compression assembly 222 is no longer sufficient to overcome the opposing force of the spring 241.

Figure 9:
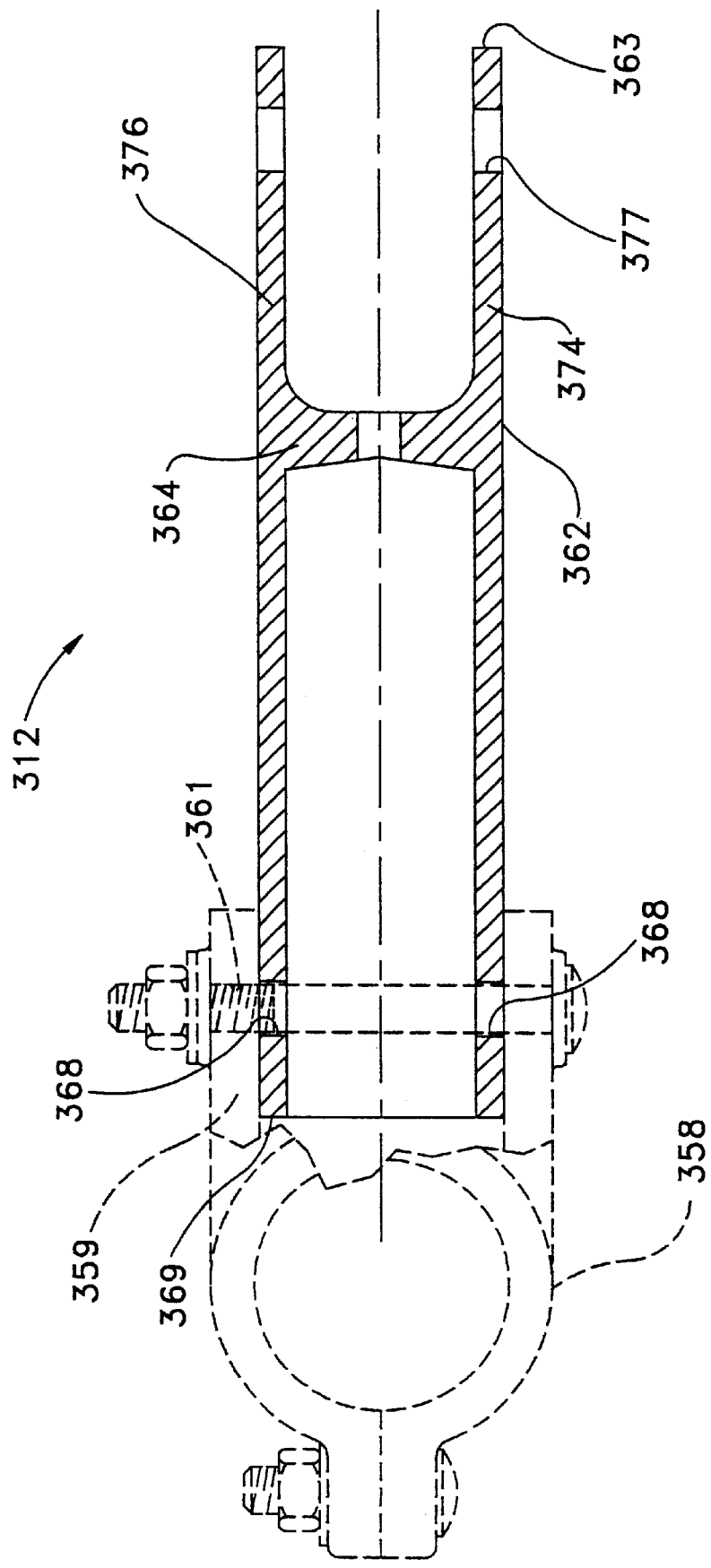
FIG. 9 is a cross sectional view of an alternative embodiment of the second arm of the marine docking device of FIG. 2.

Referring now to FIG. 9, there is illustrated an alternative embodiment 312 of the second arm 12. The second arm 312 is a simplification of the second arm 12, however, a number of components of the arm 312 are similar, or identical, to components described previously for arm 12. For instance, the arm 312 includes a second mounting bracket 358 that is identical to the mounting bracket 58. Thus, a detailed description of this component will not be repeated. For continuity, those components that are similar, or identical, to features described previously have been labeled with feature numbers in the 300 series corresponding to the feature numbers for the first embodiment, which were between 58 and 99.

The second arm 312 includes a hollow tubular member 362 composed of aluminum or another suitable material. Two spaced apart arms 374 and 376 are integral with and extend from a first end 363 of the second arm 312. Thus, the separate U-shaped clevis 72 of the arm 12 is omitted in this embodiment. Extending through the arms 374 and 376 are axially aligned bores 377.

A pair of transversely aligned bores 368 are provided at a second end 369 of the tubular member 362. An outer diameter of the tubular member 62 is less than the inner diameter of the receiving portion 359 of the second mounting bracket 358 so the tubular member 362 can be received therein. The bores 368 are aligned with the bores 361 on the receiving portion 359 so that a suitable fastener can be inserted therethrough.

It should be appreciated that the foregoing description is for the purposes of illustration only, and alternative embodiments of this invention are possible without departing from the scope of the claims. For instance, an alternative spring arrangement could be substituted for the single spring arrangement that has been illustrated. The compression assembly could include a first spring compressed between the pin and the end wall and a second spring compressed between the pin and the end of the tubular member that is adjacent the mounting bracket. In this instance, movement of the end wall with respect to the pin would be controlled by the first spring, while movement of the pin with respect to the tubular member would be controlled by the second spring. Here, the second spring could have a lower preload to control the initial movement of the pin toward its retracted position. The first spring could have a higher preload to control the secondary retraction of the end wall once the pin is seated in its retracted position. Alternatively, a first, inner spring could be compressed between. the end wall and the pin and a second, outer spring could be compressed between the tubular member and the end wall. Here, the first spring would control movement of the pin with respect to the end wall and the second spring would control movement of the end wall with respect to the tubular member.

In addition to these alternatives, the second arm of the marine docking device could be modified to include a compression assembly. Thus, in response to a force exerted on the fender, both the first and the second arm would compress. Further, in the second embodiment, the bolt could be secured to the end wall by an alternative means, such as an adhesive. Additionally, the two component sleeve of the second embodiment could be replaced by a single sleeve member, such as illustrated for use with the first embodiment of the present invention.

Thus, although particular preferred embodiments of the present invention have been disclosed in detail for illustrative purposes, it will be recognized that variations or modifications lie within the scope of the present invention and do not depart from the spirit of the invention, as set forth in the foregoing description and drawings, and in the following claims.

What is claimed is:

1. A marine docking device, comprising:
   a fender configured to contact a watercraft hull and having a first end coupled to a first arm by a first attachment member and a second end coupled to a second arm by a second attachment member, said first and second attachment members being configured to prevent said fender from rotating about a longitudinal axis that passes through said first end and said second end;
   said first arm including a compression assembly that is coupled to said first attachment member to facilitate movement of said first end of said fender between a first position and a second position;
   said compression assembly including a tubular member that is slidable within a sleeve, and a spring that is compressed between a first spring abutment provided on said sleeve and a second spring abutment provided on said tubular member;
   said first spring abutment being movable with respect to said tubular member from an advanced position to a retracted position against an urging of said spring;
   said first spring abutment being continuously urged toward said advanced position by said spring;
   said first spring abutment being in said advanced position when said first end is in said first position; and
   said first spring abutment being in said retracted position when said first end is in said second position.

2. The marine docking device of claim 1 wherein said second spring abutment is incapable of movement with respect to said sleeve.

3. The marine docking device of claim 1 wherein said tubular member defines a slot;
   said sleeve includes a bolt;
   said bolt has a threaded end adjacent said first spring abutment and a head that includes a pin;
   said pin is received in said slot and is movable within said slot between an advanced position and a retracted position;
   said pin is in said advanced position when said first end is in said first position; and
   said pin is in said advanced position when said first end is in said second position.

4. The marine docking device of claim 3 wherein said threaded end of said bolt is secured to said first spring abutment such that said bolt is prevented from movement with respect to said first spring abutment.

5. The marine docking device of claim 3 wherein said first spring abutment is configured to allow movement of said bolt with respect to said first spring abutment.

6. The marine docking device of claim 5 wherein said spring is at least partially compressed when said first end of said fender is in said second position;

said first end of said fender is moveable to a third position; and said first spring abutment is in said retracted position and said spring is further compressed when said first end of said fender is in said third position.

7. The marine docking device of claim 1 wherein said second arm is incompressible.

8. The marine docking device of claim 1 wherein said second arm includes a second compression assembly that is coupled to said second attachment member to facilitate movement of said second end of said fender between a first position and a second position;

said second compression assembly includes a second tubular member that is slidable within a second sleeve, and a second spring that is compressed between a movable spring abutment provided on said second sleeve and a fixed spring abutment provided on said tubular member;

said movable spring abutment is movable with respect to said tubular member between an advanced position and a retracted position against an urging of said second spring;

said movable spring abutment is continuously urged toward said advanced position by said second spring;

said movable spring abutment is in said advanced position when said second end is in said first position; and said movable spring abutment is in said retracted position when said second end is in said second position.

9. The marine docking device of claim 1 wherein at least one of said first arm and said second arm is at least partially covered by a padded material.

10. The marine docking device of claim 1 wherein said second attachment member is a portion of said second arm and is integral therewith.

11. The marine docking device of claim 1 wherein said first spring abutment is an interior surface of said sleeve; and said second spring abutment is a bottom surface of a recess set in said tubular member.

12. The marine docking device of claim 11 wherein said first spring abutment is an interior annular step provided on said sleeve.

13. The marine docking device of claim 11 wherein said first attachment member is a portion of said first arm and is integral therewith.

* * * * *